UNITED STATES PATENT OFFICE.

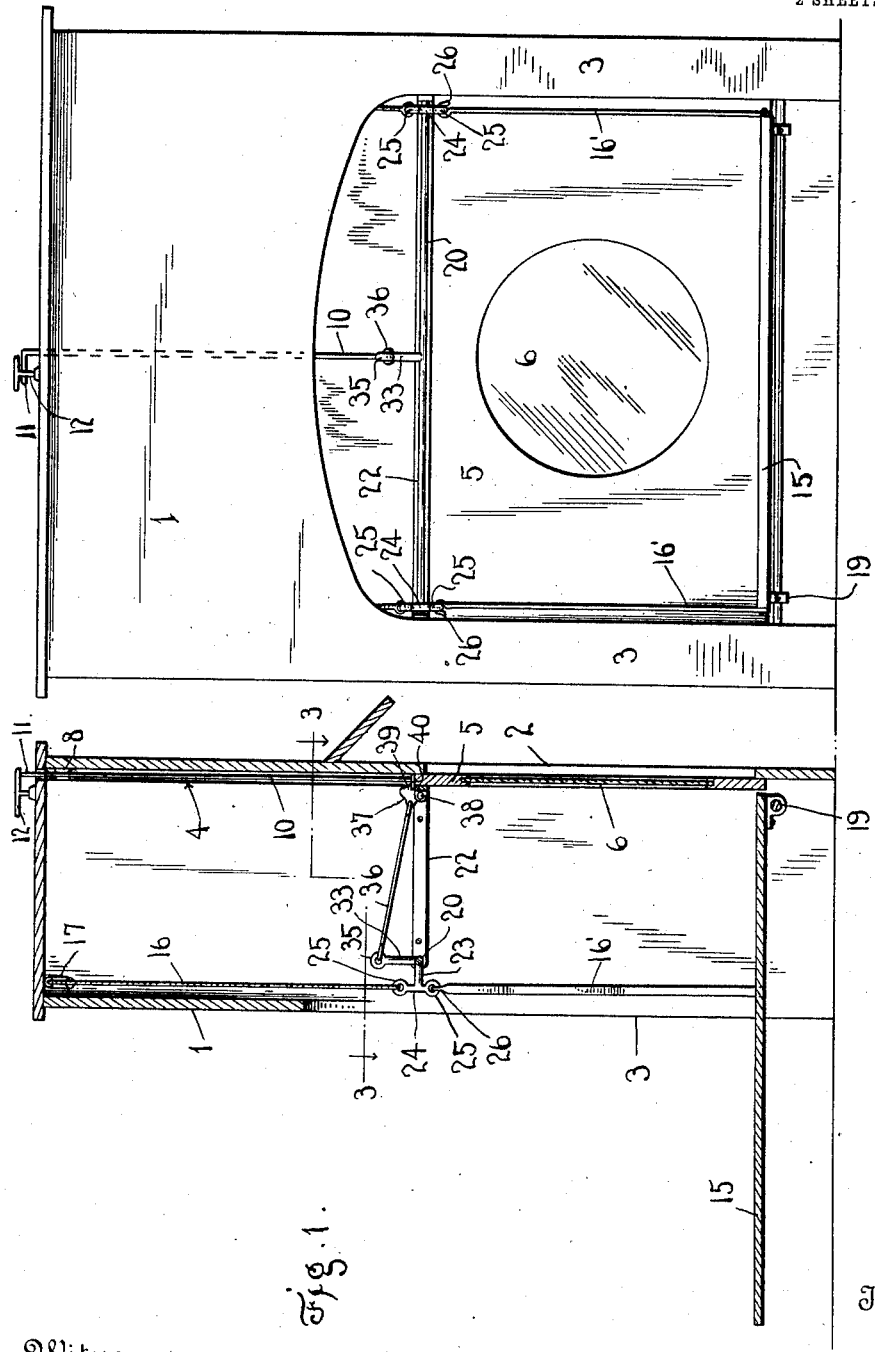

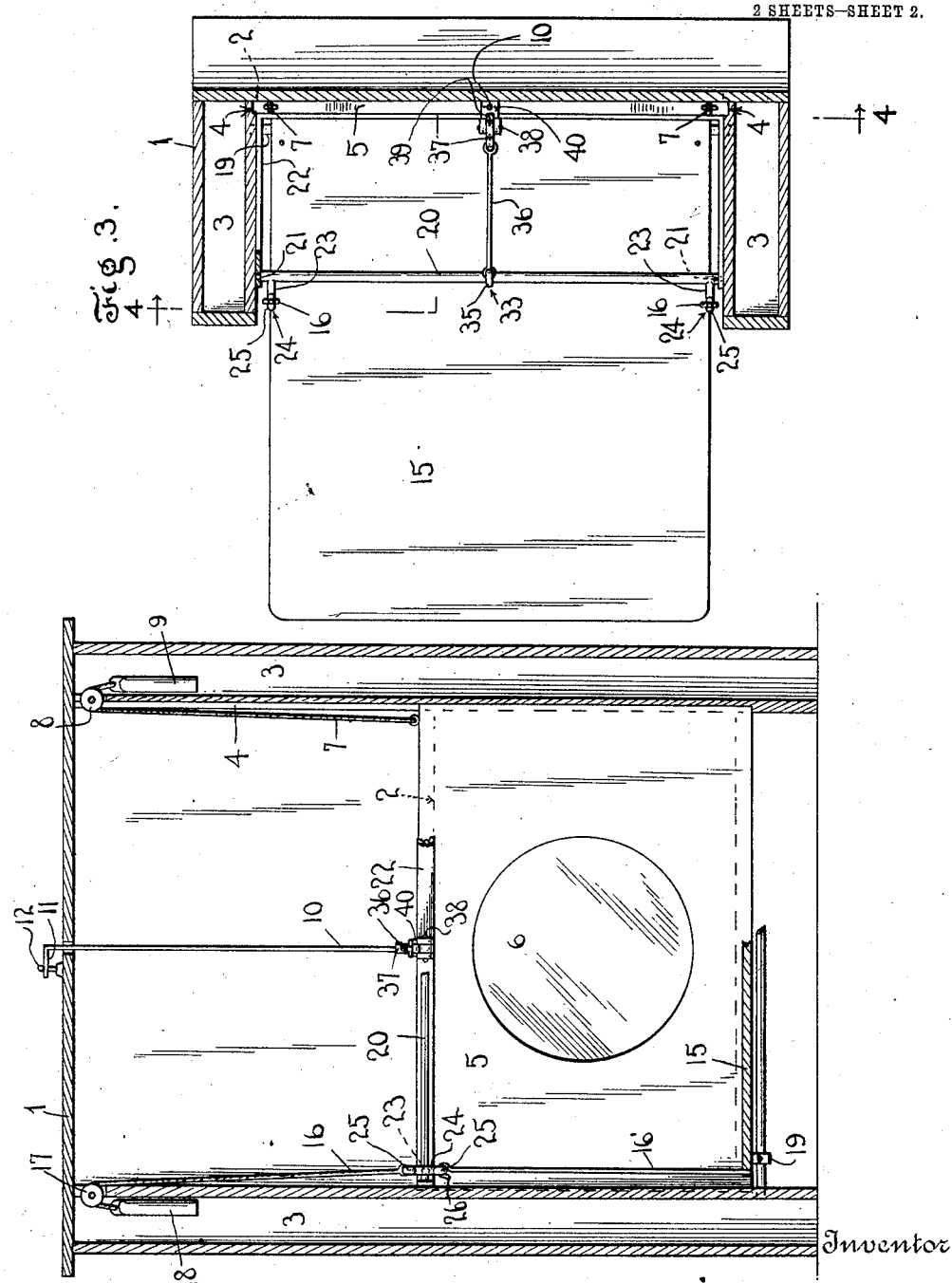

ROBERT H. SHAW, OF LOGAN, OHIO.

POULTRY-HOUSE DOOR.

1,043,543.  Specification of Letters Patent.  Patented Nov. 5, 1912.

Application filed February 15, 1912. Serial No. 677,746.

*To all whom it may concern:*

Be it known that I, ROBERT H. SHAW, a citizen of the United States, residing at Logan, in the county of Hocking and State of Ohio, have invented certain new and useful Improvements in Poultry-House Doors; and I do declare the following to be a full, clear, and exact description of the invention, such as will enable others skilled in the art to which it appertains to make and use the same.

This invention relates to animal husbandry, and more especially to cages and houses; and the object of the same is to produce a doorway more particularly useful in poultry houses which the fowls can open in the morning when they desire to pass out. This object is accomplished by the specific construction hereinafter more fully described and claimed, and as shown in the drawings wherein—

Figure 1 is a central vertical longitudinal sectional view, and Fig. 2 an inside elevation of this improved poultry house door, with the doorway closed by the door. Fig. 3 is a horizontal section on the line 3—3 of Fig. 1, and Fig. 4 is an upright section on the line 4—4 of Fig. 3.

In the drawings the numeral 1 designates a frame which is made double the height of the door-opening 2 and a little wider than the same so that there are boxes 3 at the sides of the frame for containing the weights described below, much like an ordinary window frame. Movable vertically in guides 4 within this frame is the door 5 having a glass panel 6, and cords or ropes 7 extend upward from the corners of this door and pass over pulleys 8 to weights 9 which hang in the boxes 3, these weights being of sufficient size to lift the door when the latter is released. A rod 10 rises from the door through the top of the frame 1 where it carries a handle 11, and a button 12 is pivoted on said top and adapted to be turned over the handle when the latter is depressed, thereby preventing the rise of the door at times when the operator desires to lock it closed. By turning the button aside the handle is free, and the door may be lifted by hand or automatically as described below. I may here explain that this door frame forms part of the wall of a house for containing domestic animals, more particularly fowls, and in order that the handle and button may be accessible the frame is preferably built so as to extend a little beyond the wall of the house in a manner which will be clear without fuller amplification.

The numeral 15 designates a platform whose front end stands beneath the opening 2, its body extending through the frame 1, and its other end normally supported by ropes or cords 16 which pass upward and over pulleys 17 in the frame and downward to weights 18 which move in the pockets or boxes 3, and these weights are of sufficient size to hold the platform normally level as seen in Fig. 1. I preferably hinge the front corners to the boxes 3 as shown at 19, and the device serves as a hinged platform by which title I will refer to it hereinafter.

The numeral 20 designates a rock shaft having studs 21 at its extremities journaled in the ends of a U-shaped bracket 22 which is mounted within the frame, and also having projecting from it near its studs two arms 23 to which the cords 16 are attached, the preferable form of attachment being by means of T-shaped heads 24 on the arms 23, which heads have eyes 25 at their upper and lower ends with which the cord engages. In Fig. 1 the lower section 16′ of the cord is shown in the form of a strap having a hook 26 at its upper end removably engaging the lowermost eye so that the platform 15 can be disconnected from the rock shaft and its weights when desired, but this is a detail of construction which may or may not be adopted as preferred. From said shaft 20 projects another arm 33 standing at right angles to the arms 23 so that in effect this shaft and its arms constitute a bell-crank lever pivoted at its angle and having one arm double. The single arm 33 preferably has an eye 35 at its outer end, and connected thereto is a rod 36 which leads to a catch 37 pivoted at 38 in the bracket 22 and having a beveled nose 39 adapted to engage a keeper 40 on the upper edge of the door 5. All parts of this device are of the desired sizes, shapes, proportions and materials, and considerable latitude must be allowed the manufacturer in building it. While I have described it as used in connection with a poultry house, it is obvious that it could be used elsewhere as upon a kennel, or perhaps if made in larger size it might be used for larger animals.

The parts of this device being constructed and connected as described, when the door stands open throughout the day the fowls can enter their house whenever they wish, and in passing over the platform they only actuate the catch 37 which is already disengaged from the keeper and no result follows. At twilight when the fowls have all sought their house, the poultry man makes his rounds and at each house he pushes downward on the handle 11, thus moving the door 5 downward until its keeper 40 passes under the beveled nose 39 of the catch so that the latter holds the door closed. If he desires to lock the door in this position, he turns the button 12, but in that case the button must be moved out of engagement with the handle 11 in the morning before the fowls can pass out. Ordinarily he will not turn the button 12, and the parts therefore stand in the position shown in Fig. 2. In the morning the light shows through the glass panel 6, and the first fowl which seeks to get out passes up over the platform 15 toward said panel, its weight depressing the inner end of the platform and drawing downward on the cord-sections 16' so that the arms 23 are depressed and the rock shaft 20 is turned. Its arm 33 therefore draws upon the rod 36, and the catch 37 is turned on its pivot to disengage its nose from the keeper 40, with the result that the weights 9 cause the ascent of the door 5, and the doorway is opened so that the fowls may pass out.

Thus it will be seen that I have produced an improved device which permits the fowls to seek their home at any time during the day when there is little likelihood that nocturnal animals would be around, and which permits them to pass out of their home as early in the morning as it becomes light enough for them to care to do so. The only attention required from the poultry man is in the evening after the fowls have retired, on which occasion he would doubtless be making his rounds to collect the eggs and perhaps to replenish feed and water, and at this time all he has to do for each of these improved doors is to push downward on the handle.

What is claimed as new is:

1. In a house for poultry or the like, the combination with a frame having a door opening, a door having means for admitting daylight, means for throwing the door open, a catch and keeper for holding it when closed, a movable platform within the house adjacent the door, and connections between said platform and catch for the purpose set forth; of a rod leading from the door upward through the top of the frame and having a handle, and a button adapted to be turned into engagement with the handle.

2. In a poultry house door, the combination with a frame having a door opening through its lower portion and boxes at its sides, a door moving over said opening and having a glass panel, cords leading from said door upward over pulleys and into said boxes, and weights within the latter attached to said cords for normally raising the door to uncover the door-opening; of a rod leading from the door upward through the top of the frame and having a handle, and a button adapted to be turned into engagement with the handle.

3. In a poultry house door, the combination with a frame having a door opening through its lower portion and boxes at its sides, a door moving over said opening and having a glass panel, cords leading from said door upward over pulleys and into said boxes, and weights within the latter attached to said cords for normally raising the door to uncover the door opening; of a rod leading from the door upward through the top of the frame and having a handle, a button adapted to be turned into engagement with the handle, a catch adapted to engage said door when it is depressed, a tilting platform within the house, and connections between said platform and catch.

4. In a poultry house door, the combination with a frame having a door opening, a door having means for admitting daylight, means for normally raising the door so as to expose said opening, and a catch and keeper at the center of the door for holding it closed; of a U-shaped bracket secured within the frame and supporting said catch, a transverse rock shaft having its extremities journaled in the arms of said bracket, a single arm rising from the center of said shaft and connected with said catch, a pair of arms projecting rearwardly from this shaft near its extremities and each having a T-head with eyes in the extremities of the head, a tilting platform pivoted within the frame adjacent the door opening, a cord rising from each edge of said platform and made in two sections, the lowermost having a hook at its upper end engaging the lowermost of said eyes and the uppermost section rising from the uppermost eyes and passing over a pulley in the frame, and weights on the outer end of the last-named sections.

5. In a poultry house door, the combination with a frame having a door opening through its lower portion and boxes at its sides, a door moving over said opening and having a glass panel, cords leading from said door upward over pulleys and into said boxes, and weights within the latter attached to said cords for normally raising the door to uncover the door opening; of a keeper on the upper edge of the door, a catch engaging the keeper when the door is depressed, a bracket within the frame to which said catch is pivoted, a rock shaft journaled in the bracket and having one arm connected with said catch and two others near its ends, a tilting platform within the house, cords leading upward from it over pulleys and into said boxes, a second set of weights therein secured to said cords, and connections between the latter and the endmost arms on said shaft for the purpose set forth.

In testimony whereof I have hereunto set my hand in presence of two subscribing witnesses.

ROBERT H. SHAW.

Witnesses:
HENRY T. LEACH,
D. M. SOLIDAY.

Copies of this patent may be obtained for five cents each, by addressing the "Commissioner of Patents, Washington, D. C."